I. Winslow,
Green Corn Knife.

Nº 51,379.   Patented Dec. 5, 1865.

Witnesses
Henry C. Molloway
A. L. Hayes

Inventor
Isaac Winslow
by his Attorney
Daniel Breed

UNITED STATES PATENT OFFICE.

ISAAC WINSLOW, OF PHILADELPHIA, PENNSYLVANIA.

IMPROVEMENT IN KNIVES FOR REMOVING GREEN CORN FROM THE COB.

Specification forming part of Letters Patent No. 51,379, dated December 5, 1865.

*To all whom it may concern:*

Be it known that I, ISAAC WINSLOW, of Philadelphia, in the county of Philadelphia and State of Pennsylvania, have invented a new and useful Improvement in Knives for Removing Green Corn from the Cob; and I do hereby declare that the following is a full and exact description thereof, reference being had to the accompanying drawings, and to the letters of reference marked thereon.

My invention consists of a curved knife, provided with a gage for the purpose of removing green corn from the cob.

After trying many methods of preserving green corn for winter use, I have obtained the most satisfactory by removing the corn from the cob and then sealing and boiling the same in tin cans, as described in a process for which I have already received Letters Patent of the United States. As the corn is used when the kernels are in the milky state, the operation of removing them from the cob is somewhat difficult. In order to facilitate this operation I have invented a curved knife and armed the same with a gage.

Figure 1:
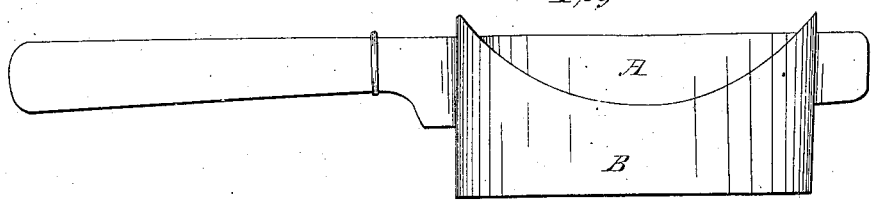
Figure 2:
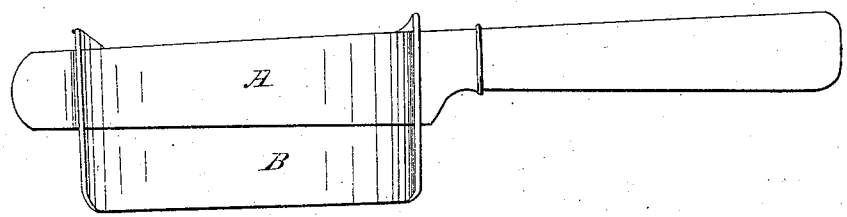
Figure 3:
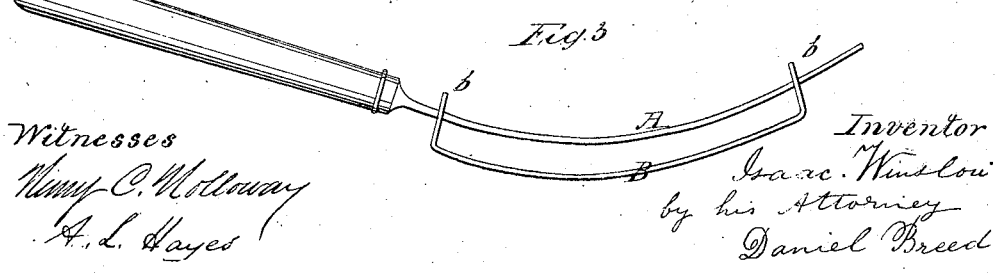

In the accompanying drawings, Figure 1 is a side view of my curved knife with the gage thereon. Fig. 2 is a reverse side view of the same. Fig. 3 is a top or back view of the knife and gage.

In my first attempts to use a curved knife I took a common case-knife and bent the blade laterally, so as to apply the curvature to the circumference of the cob. Then I fitted a gage to the blade of the knife and soldered the same thereon, in order to regulate the cutting of the knife and prevent cutting into the cob when removing the corn. Such a simple knife is represented in the accompanying drawings, the blade of the knife being shown at A and the shield at B in Figs. 1, 2, and 3. The gage B is made of tin-plate or other metal and provided with ears $b$, through which the blade of the knife passes. The upper or back part of this gage may be slightly curved, as seen in Fig. 1, so as better to prevent clogging.

The space between the knife and the gage should nearly correspond with the size or length of the kernels of corn to be cut from the cob.

I propose to manufacture knives especially for cutting green corn from the cob, and to vary the shape and dimensions of the blade and handle somewhat from the rude knife above described.

I am aware that spoke-shaves have been curved, the stock forming a gage; but such instruments could not serve the purpose of my improved knife, the gage of which is very broad and projects forward of the edge of the knife.

Having thus fully described my invention, what I claim, and desire to secure by Letters Patent of the United States, is—

The above-described curved knife, provided with a broad flat gage, for the purpose of cutting green corn from the cob, substantially in the manner set forth.

ISAAC WINSLOW.

Witnesses:
FREDERICK FOX,
IRA J. BATCHELOR.